Sept. 7, 1948.      W. F. VAN LOENEN      2,448,848
ELECTROPHORETIC SEPARATING APPARATUS
Filed July 18, 1944
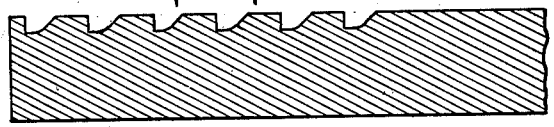
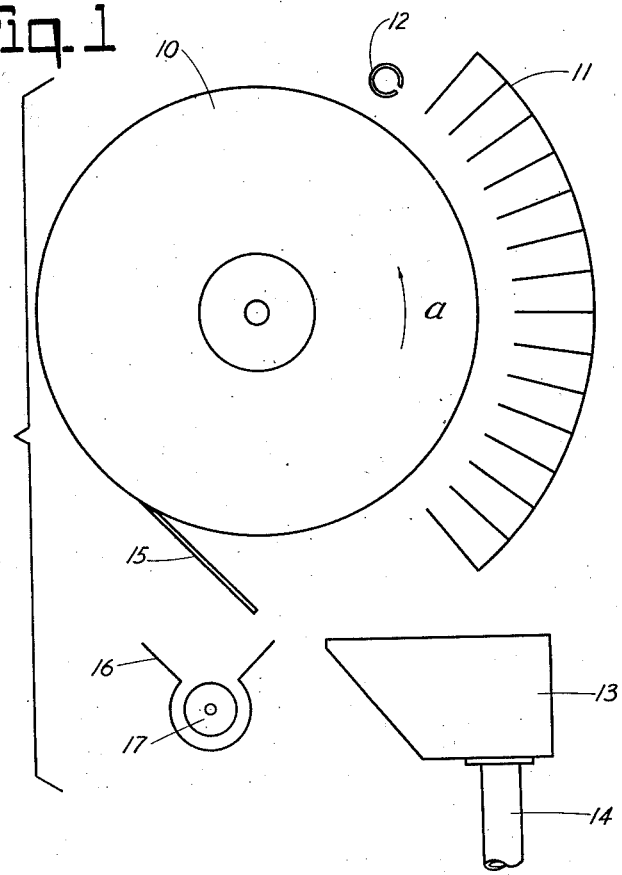
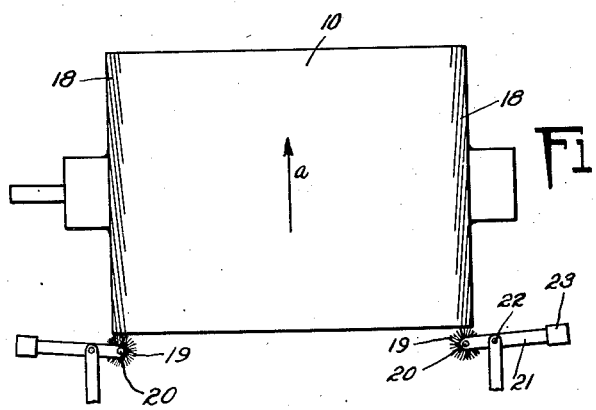
INVENTOR.
WILLIAM F. VAN LOENEN
BY
James E. Toomey
Agt Patented Sept. 7, 1948

2,448,848

UNITED STATES PATENT OFFICE 2,448,848

ELECTROPHORETIC SEPARATING APPARATUS

William F. Van Loenen, Los Altos, Calif., assignor, by mesne assignments, to Permanente Metals Corporation, a corporation of Delaware Application July 18, 1944, Serial No. 545,500

1 Claim. (Cl. 204—300)

This invention relates to the separation of finely divided solids from liquids by electrophoresis and particularly to apparatus for effecting such separation wherein a film of liquid containing solids to be separated therefrom is caused to flow downwardly over the upwardly moving surface of a continuously rotating horizontal drum.

One application to which the invention is adapted is the separation of magnesium dust from liquid hydrocarbons and the invention will be disclosed in its relation to that particular application for purposes of illustration. The description is however not to be taken as limiting the invention to the example given as its usefulness is not confined to any particular solids nor to any particular liquid medium from which the solids are being separated.

In the carbothermic process for manufacturing magnesium the furnace product is a mixture of extremely finely divided magnesium particles with some carbon and some magnesium oxide. This mixture, usually referred to as "magnesium dust," is later pelleted and subjected in pellet form to a distillation or sublimation process by which the pure magnesium is recovered in a solid crystalline deposit. Magnesium dust is readily oxidizable and consequently is highly pyrophoric. As a result it has become common practice to protect the dust by wetting it with an abundance of liquid hydrocarbon. This may be accomplished by using a liquid hydrocarbon chilling medium for the vapor evolved in the course of thermic reduction or immediately after chilling with a gaseous or solid medium. The liquid hydrocarbon and the dust form a slurry which may be safely and conveniently handled through the steps leading up to sublimation.

The separation of the solids from the slurry becomes necessary but due to their extremely finely divided state conventional methods of separation such as settling, centrifuging and filtration have proven inadequate.

Electrophoretic separation has proven satisfactory for this purpose. One apparatus in use for effecting continuous electrophoretic separation comprises a horizontally disposed rotary drum. An electrically charged anode spaced from the drum sets up a field of which the drum constitutes the opposite pole. This field is created at the side of the drum which moves upwardly during its rotation and a film of slurry containing a suspension of the solids to be separated is released to pass downwardly over this same side of the drum. As the slurry passes through the field its solids are deposited on the drum and adhere thereto to be carried upwardly and over to the opposite side where they may be removed by the action of a scraper. The film, which has upon the removal of its solids, become a clear liquid continues downwardly and flows off the bottom of the drum to be received in a hopper-like receptacle provided for that purpose.

The film of slurry which passes downwardly over the upwardly moving side of the drum should be confined to the cylindrical surface of the drum where it will be subjected to the full effect of the electrostatic field and where all of the solids deposited will be presented to the action of the scraper which acts against the cylindrical surface. There is a tendency however for the downwardly flowing film to spread and to exceed the limits of the cylindrical surface of the drum.

It is the object of the present invention to provide an apparatus of the kind described in which a film of liquid flowing downwardly over an upwardly moving cylindrical surface will be confined to the surface and prevented from overflowing the edges thereof. A further object is to provide such confining means in a manner which will not interfere with the operation of a scraper or other similar means acting against the cylindrical surface.

Further objects and advantages of the invention are made apparent in the following specification wherein reference is made to the accompanying drawings showing one form which the invention may assume.

In the drawings:

Fig. 1 is an end elevation showing diagrammatically an apparatus of the kind to which the present invention pertains.

Fig. 2 is a front elevation of a drum which forms a part of the apparatus shown in Fig. 1 illustrating the application of the invention, and Fig. 3 is an enlarged section of a portion of the drum showing in cross section the details of a series of grooves cut therein.

Referring to the drawings in detail Fig. 1 shows a drum 10 mounted for rotation in the direction of the arrow a. Adjacent the side of the drum which moves upwardly during its rotation is an anode 11 shown as consisting of a plurality of pointed members arranged in the direction of the radii of the drum. The anode and drum, which is of steel or other electrical conducting material, are electrically charged to opposite signs to create a field the purpose of which is to cause electrophoretic deposition, on the surface of the drum, of solid particles contained in the film of liquid passing over the surface within this field. Liquid in the form of a slurry containing solids to be separated therefrom is supplied to the surface of the drum through a slit in a pipe or header 12 arranged above the drum and flows downwardly until all of the solids therein have been caused to adhere to the drum surface. The clear liquid resulting from this treatment flows off of the drum to receptacle 13 and then through a discharge pipe 14. The solids which adhere to the drum are carried upwardly and over the top of the drum until they come in contact with a scraper indicated at 15 by means of which they are scraped off of the drum and caused to deposit in a trough 16 from which they are continuously discharged by a screw conveyor indicated at 17.

In order to prevent the film of liquid from overflowing the ends of the drum as it passes downwardly thereover the drum is as shown in Fig. 2 provided with a series of grooves 18 adjacent each of its edges these grooves which originate at or near the extreme edge of the cylindrical surface of the drum are inclined inwardly, preferably following a helical path, and terminating a short distance, say, two or three inches from the edges of the drum. The grooves of the opposite edges of the drum are inclined oppositely so that all of the grooves tend to feed toward the center of the drum. As the result of this construction any part of the liquid film flowing downwardly which spreads toward the edges of the drum is received in the grooves and due to the inward feeding effect of the grooves and the downward gravitation of the liquid it is caused to flow back on to the smooth cylindrical surface, that is, the medial portion, rather than to overflow the edges of the drum. The grooves are preferably shaped as indicated in Fig. 3 of the drawings wherein each groove is shown as having its outer wall vertical to obstruct the outward flow of the liquid and its inner wall as sloping at approximately 45° to facilitate the flow of the liquid back toward the center of the drum as it is directed by the feeding action of the grooves. Grooves arranged in the manner described have proven capable of confining the liquid slurry to the surface of the drum though there is a tendency for the grooves to become filled with concentrated slurry and with the finely divided solids which adhere to the surface within the grooves as well as to the smooth surface of the drum.

In order to prevent this tendency for the grooves to become fouled they are continuously cleaned by brushes indicated at 19 in Fig. 2. The brushes shown are preferably circular wire brushes having radially extending bristles the ends of which are positioned to enter the grooves at the bottom of the drum. These brushes 19 are mounted for rotation on pins 20 carried by lever arms 21 which are pivoted as at 22 and preferably provided with counterweights 23 or other means for holding the brushes in firm engagement with the drum and causing the bristles to enter the grooves to be cleaned. Because of the angular or helical disposition of the grooves and the fact that some of the bristles of the brush enter them the brushes are caused to rotate about their supports 20. This produces what is in effect a worm drive imparting rotation to the brushes on the pins 20. As the brushes are pressed firmly against the grooved portions of the drum by counterweights the bristles are compressed or bent during their cleaning contact with the grooves. As the bristles leave the grooves due to the rotation of the brush they snap back into a normal position with sufficient force to clean themselves by discharging the matter collected during the time they were in the grooves.

The apparatus herein described interferes in no way with the continuous operation of the drum and continuous flow of fluid thereover as the grooves constantly tend to feed the fluid which flows toward the edges of the drum back into its intended path and the brushes which clean the grooves are continuously rotated by the action of the drum and are also self cleaning as the result of their rotary motion.

I claim:

Apparatus for removing particles in suspension from liquids comprising a horizontally disposed rotating cylindrical electrode having a smooth medial portion and at each of the outer edges of the cylindrical surface thereof a series of helical grooves cut in a direction toward the center of said rotating electrode, the grooves forming substantially an acute angle with a plane perpendicular to the axis of rotation of the said electrode, a fixed electrode adjacent to a substantial portion of the surface of said revolving electrode and having an electrostatic charge thereon different from said revolving electrode, fluid discharge means adjacent to the upper portion of said fixed electrode and adapted to spread a film of liquid containing said particles across the surface of said rotating electrode for subjecting said film to said electrostatic charge, said film tending to flow over the surface of said rotating electrode in a direction opposed to the normal movement of said surface, said series of helical grooves to feed toward the center of said revolving electrode for a predetermined direction of rotation thereof any liquid tending to overflow the edges of said revolving electrode, and means for cleaning the said outer edges of said revolving electrode, said cleaning means comprising rotatable brushes having radially disposed bristles, the brushes being so mounted that the bristles are pressed substantially perpendicularly into the said helical grooves whereby rotation of the electrode causes rotation of the brushes.

WILLIAM F. VAN LOENEN.

REFERENCES CITED

The following references are of record in the file of this patent:

UNITED STATES PATENTS

| Number | Name | Date |
|---|---|---|
| 565,121 | Riley | Aug. 4, 1896 |
| 916,139 | Fullerton | Mar. 23, 1909 |
| 1,145,996 | Julian | July 13, 1915 |
| 1,243,808 | Caffrey | Oct. 23, 1917 |
| 2,109,125 | Aldridge et al. | Feb. 22, 1938 |
| 2,199,228 | Obenshain et al. | Apr. 30, 1940 |
| 2,302,386 | Fisher | Nov. 17, 1942 |
| 2,376,535 | Fisher | May 22, 1945 |